(12) United States Patent
Chapman, Jr. et al.

(10) Patent No.: US 7,135,965 B2
(45) Date of Patent: Nov. 14, 2006

(54) HAZARDOUS CONDITION DETECTION SYSTEM AND METHOD AND THERMOSTAT FOR USE THEREWITH

(75) Inventors: John Gilman Chapman, Jr., Delaware, OH (US); Nicholas Ashworth, Dublin, OH (US); Robert Burt, Columbus, OH (US); Timothy E. Wallaert, New Hudson, MI (US)

(73) Assignee: Maple Chase Company, Carol Stream, IL (US)

( * ) Notice: Subject to any disclaimer, the term of this patent is extended or adjusted under 35 U.S.C. 154(b) by 0 days.

(21) Appl. No.: 11/031,237

(22) Filed: Jan. 6, 2005

(65) Prior Publication Data

US 2005/0156731 A1 Jul. 21, 2005

Related U.S. Application Data

(60) Provisional application No. 60/535,288, filed on Jan. 8, 2004.

(51) Int. Cl.
*G08B 29/00* (2006.01)

(52) U.S. Cl. ............... 340/514; 340/501; 340/505; 340/581; 340/588; 340/870.17; 236/91 R; 236/91 D; 236/94

(58) Field of Classification Search ............... 340/514, 340/581, 584, 588, 501, 506, 870.01, 870.16, 340/628, 632, 870.17, 505; 237/2 R, 12.5, 237/12.6, 1 R; 236/91 R, 91 D, 91 E, 40, 236/3, 41, 4, 94; 392/363; 700/17, 201, 700/202, 216; 205/209
See application file for complete search history.

(56) References Cited

U.S. PATENT DOCUMENTS

| | | | | |
|---|---|---|---|---|
| 5,476,221 A | * | 12/1995 | Seymour | 236/47 |
| 5,947,372 A | * | 9/1999 | Tiernan | 236/94 |
| 6,484,951 B1 | * | 11/2002 | Mueller | 237/2 A |
| 6,776,708 B1 | * | 8/2004 | Daoutis et al. | 454/229 |

* cited by examiner

*Primary Examiner*—Davetta W. Goins
(74) *Attorney, Agent, or Firm*—Reinhart Boerner Van Deuren P.C.

(57) ABSTRACT

An intelligent thermostat communicates with threat detectors to allow periodic remote testing of the detector. The real-time clock and calendar functions of the thermostat allow the consumer to program the day, time, and frequency of the testing. The thermostat then communicates a test control signal to each of the detectors to initiate the self-test. The communication may be wired or wireless. During testing the thermostat displays a detector test screen. Upon completion of the self-test, the thermostat displays a test results screen for user confirmation. This results screen will indicate that the test passed or failed along with any diagnostic information provided by the detector. The thermostat also provides a test initiation screen from which the consumer may initiate a detector self-test manually. Loss of communications with a detector is also communicated to the user, as is the location of the detector that first identified a threat.

20 Claims, 3 Drawing Sheets

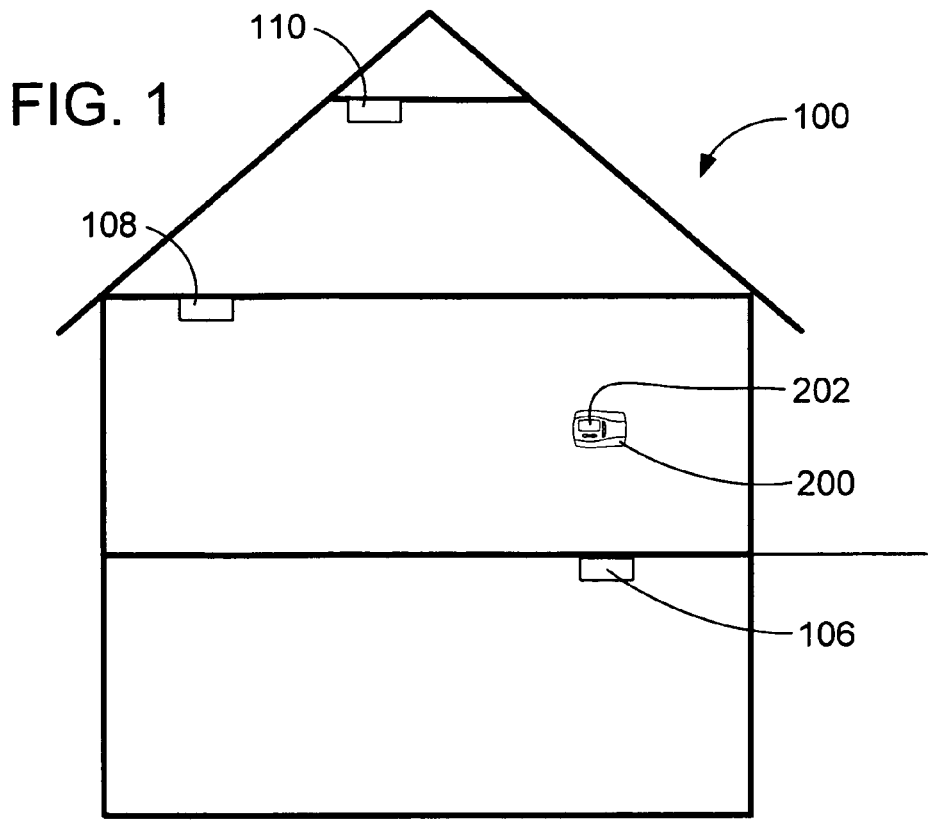
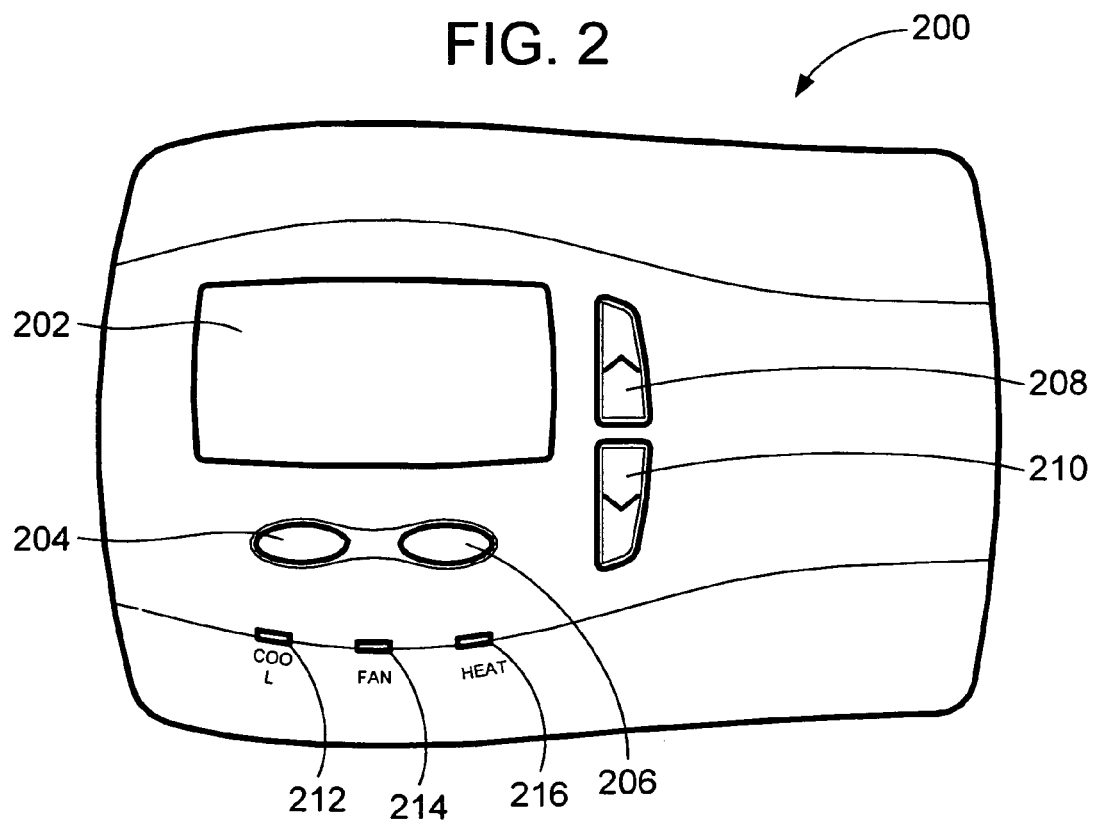

HAZARDOUS CONDITION DETECTION SYSTEM AND METHOD AND THERMOSTAT FOR USE THEREWITH

CROSS-REFERENCE TO RELATED PATENT APPLICATIONS

This patent application claims the benefit of U.S. Provisional Patent Application No. 60/535,288, filed Jan. 8, 2004, the teachings and disclosure of which are hereby incorporated in their entireties by reference thereto.

FIELD OF THE INVENTION

The present invention relates generally to threat detector testing and control systems, and more particularly to an appliance control system that allows remote, automatic periodic testing of smoke and other threat detectors.

BACKGROUND OF THE INVENTION

Recognizing the lifesaving benefits of smoke and other threat detectors, more and more consumers are installing these devices in their homes. Indeed, many municipalities have enacted building ordinances that require that smoke detectors be installed in new construction and in order to sell an existing home. Apartment buildings and other commercial structures typically also include such smoke detectors. While many commercial structures and many newly constructed single-family dwellings include centrally powered smoke detectors, i.e. powered from the main electrical system of the dwelling, almost all other smoke detectors installed by consumers are battery powered. Indeed, many centrally powered smoke detectors still include a backup battery so that the benefits of the detector are not lost during a power outage.

Unfortunately, while the life saving benefits of the smoke detectors cannot be discounted, such smoke detectors continue to be a source of annoyance at times for consumers. One source of annoyance results from the fact that most smoke detectors are installed on the ceiling or otherwise in a location that is not easily accessible by the average consumer without using a stepladder. Since many such smoke detectors are battery powered as discussed above, these batteries periodically need to be tested. While most manufacturers recommend that the consumer periodically test the smoke detector to make sure that the batteries and other circuits therein are still operational, many consumers do not follow these recommendations based primarily on the difficulty of reaching the smoke detector test button. Unfortunately, without periodic testing of the smoke detectors, the consumer has no assurance that they are still operational. Still further, undetected failure of the smoke detector may well leave the consumer with a false sense of security, when indeed the consumer should actually be concerned.

There exists a need, therefore, for a system that provides periodic, automatic remote testing of a smoke or other threat detector without requiring user intervention.

BRIEF SUMMARY OF THE INVENTION

In view of the above, it is an object of the present invention to provide a new and improved appliance control network that provides periodic, automatic remote testing of a smoke or other threat detector. More particularly, it is an object of the present invention to provide a new and improved appliance control network that provides such automatic, remote testing without requiring user intervention. It is a further object of the present invention to provide a central location for the generation of such testing and for the display of system diagnostic information resulting from such testing. Still further, it is an object of the present invention to provide centralized control of other diagnostic functions of a network of hazardous condition detectors, such as control of the temporary alarm locate (TAL) feature and display of hazardous condition location information derived therefrom.

In one embodiment of the present invention, the appliance control network utilizes an intelligent thermostat to provide the automatic, periodic smoke or other threat detector testing. This intelligent thermostat includes a user interface display on which system diagnostic information may be displayed, and from which the automatic testing features may be accessed. Communications circuitry in the intelligent thermostat and in each of the smoke or other threat detectors allows the diagnostic information and testing control signals to be exchanged. The communications network over which such data is exchanged may be wired or wireless. The wired configurations include individual system wiring to each detector, the inclusion of a system BUS to which each of the detectors in the intelligent thermostat connect to exchange data, etc.

An embodiment of the present invention utilizes the thermostat's knowledge of the time of day and date to schedule and initiate a threat detector test event. The user interface allows the consumer to program the day, time, and frequency that the threat detector test should be conducted. One embodiment of the present invention provides a user interface screen that allows the consumer to initiate a test on demand, in addition to the periodic, automatic test schedule programmed therein. In each embodiment, the user interface of the thermostat can display the test results and any other system diagnostic information provided as a result of the testing.

In one embodiment of the present invention, the information displayed includes information identifying a failed detector. Such failure information may be generated as a result of a test failure from one of the automatic or manual tests, or may be a result of a failure to communicate with the thermostat. Such may simply be a communications failure, or may be the result of a loss of power to the non-communicating or off-line detector, etc. This information, as well as other diagnostic and failure information may be highlighted via back lighting of the user interface, lighting or flashing of indicator lights on the thermostat, etc.

In a still further embodiment of the present invention, the diagnostic functionality of the thermostat includes initiation of the temporary alarm locate (TAL) function of interconnected hazardous condition detectors. This feature temporarily silences the alarms of interconnected hazardous condition detectors so that the location of the detecting detector may be determined. The user interface may also or alternatively display location information identifying the detecting detector, thereby precluding the need to initiate the TAL function.

BRIEF DESCRIPTION OF THE DRAWINGS

The accompanying drawings incorporated in and forming a part of the specification illustrate several aspects of the present invention, and together with the description serve to explain the principles of the invention. In the drawings:

FIG. 1 is a simplified illustration of a home environment containing a plurality of consumer appliances in which the system of the instant invention is installed;

FIG. 2 is a front view illustration of one embodiment of an advanced thermostat constructed in accordance with the teachings of the present invention.

Figure 3:
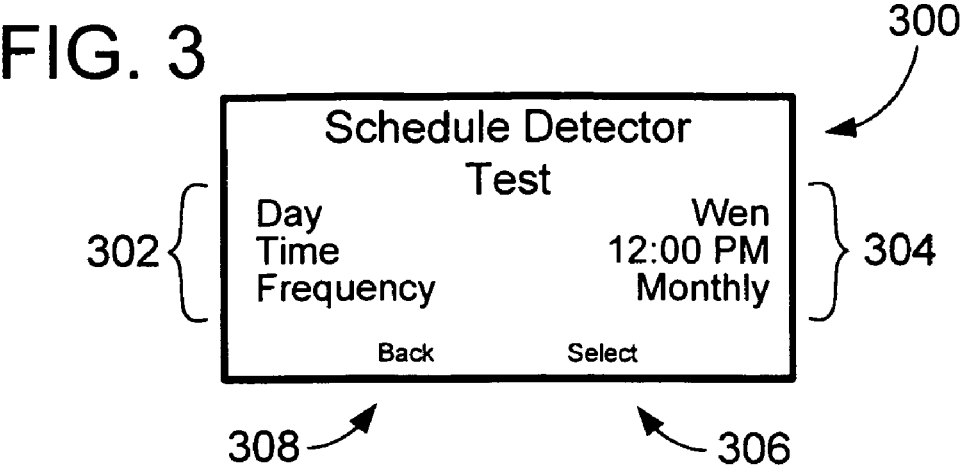
FIGS. 3–7 are exemplary detector testing, diagnostic, and threat identification screens generated by embodiments of the present invention.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

FIG. 1 illustrates a simplified home environment 100 into which the system of the present invention finds particular applicability. However, one skilled in the art will recognize that the system of the present invention is not limited to a home environment, but may also be installed in a commercial environment, etc. This typical home environment 100 includes an intelligent thermostat 200. As is typical, the thermostat 200 controls heating of the home environment 100 by a furnace (not shown), and possibly cooling of the home environment 100 by the air conditioning system (not shown). The interface to both the furnace and the air conditioning system is typically pre-wired in the home environment 100, although the communications control from the thermostat 200 may also be wireless as desired by providing receiver/transmitter circuitry in the furnace and/or the air conditioning system. Similar receiver/transmitter circuitry is also required in thermostat 200 to provide this communications capability.

In view of the recognition that smoke and other types of threat detectors save lives, the typical home environment 100 also includes a plurality of such threat detectors 106, 108, 110 installed throughout. In accordance with the present invention, these detectors 106–110 include electronic circuitry that regulates its operation. With the provision of such electronic circuitry, communication circuitry may also now be included in these detectors 106–110 to allow coordinated operation, enhanced diagnostic features, and remote controllability. Preferably, such communication circuitry includes wireless receiver/transmitter circuitry. However, the system of the present invention also allows for wired communication with the appliances via discreet wires, or via a communications BUS to which the detector is attached as will be discussed more fully below. Through the provision of such communications, the system of the present invention is particularly enabled.

Specifically, the system of the present invention includes an intelligent thermostat 200 that is capable of receiving information from and transmitting information to the detectors 106–110 located throughout the home environment 100. Such information may include threat warning notifications, diagnostic information, control signals, etc. As discussed above, detector manufacturers recommend that the consumer periodically test these detectors 106–110 to ensure proper operation thereof. To allow for such periodic testing, most detectors include a test button thereon that must be pressed for a few seconds before the detector will enter its test mode. The particular types of tests carried out by these detectors may vary, and is beyond the scope of this invention. Such tests, however, typically include sounding of its alarm(s) as a way of indicating to the consumer that the tests are being completed successfully. In the system of the present invention, however, such depressing and holding of the test button is not required to initiate a detector system test. Indeed, through the real-time clock and calendar capability of the thermostat, the consumer need not even remember to conduct such tests as they will be initiated automatically by the thermostat 200.

In order to provide this automatic testing by the thermostat 200 of the present invention, the diagnostic control signals and information must be communicated between the threat detectors 106–110 and the thermostat 200. This transmission of information and control signals may be facilitated by a wired network connecting each of the detectors 106–110 to the thermostat 200. Other wired network structures may also be utilized, including the provision of a system BUS to which each of the detectors 106–110, or a combination thereof, and the thermostat 200 connect. As is well known in the art, information communicated on the system BUS includes address information identifying the source and/or destination of the information transmitted thereon. Such individual addressing is not typically required in the wired network whereby each individual detector 106, 108, and 110 is separately wired to the thermostat 200. Various other wired infrastructures could be utilized with the system of the present invention, and are considered within the scope thereof.

With the increasing use, sophistication, reliability, data rates, and security of wireless communication protocols, a preferred embodiment of the present invention utilizes wireless communication between the detectors 106–110 and thermostat 200 to communicate system information and control signals therebetween. However, it is recognized that not all of the detectors may include such wireless communications capability. Therefore, a preferred embodiment of the thermostat 200 of the present invention includes the capability to communicate both wirelessly and through a wired connection.

For the wireless communication, various wireless communication protocols and standards may be implemented depending upon the particular home environment 100 in which the system is to be installed. That is, while the Bluetooth wireless standard may be utilized in a very small environment, its range limitations may make it unsuitable for larger or typical home environments 100. However, there are numerous other wireless protocols that can be utilized to provide the wireless connectivity between the thermostat 200 and the detectors 106–110. These other wireless protocols include, but are not limited to, the 802.11 or 802.15 family of standards. While proprietary wireless protocols may also be utilized, the use of a standard wireless protocol ensures interoperability with detectors manufactured by different manufacturers.

An embodiment of a thermostat constructed in accordance with the teachings of the present invention to incorporate the detector automatic testing features of the invention is illustrated in FIG. 2. As may be seen from this FIG. 2, this embodiment of the thermostat 200 includes a user display 202 on which is typically displayed programmatic, system, and ambient information regarding the operation of the HVAC system with which it is typically associated. This user display 202 may take various forms as are well-known in the art, and in a preferred embodiment is a dot matrix LCD display.

With such a display 202, the consumer may activate various programmatic and control functions via a pair of soft keys 204, 206. The functionality executed by these soft keys 204, 206 varies depending on the programmatic state in which the thermostat 200 is at the time one of the soft keys 204, 206 is depressed. The particular functionality that will be instituted upon selection of one of the soft keys 204, 206 is displayed in an area of the user display 202 proximate the key 204, 206 which will institute that function. That is, the function that will be instituted upon selection of soft key 204 will be located generally in the lower left hand portion of user display 202 while the functionality that will be instituted by selection of soft key 206 will be located generally in the lower right hand portion of user display 202. These functional indicators may change depending on the program state and mode in which the thermostat is currently operating.

In addition to the soft keys 204, 206, this embodiment of the thermostat 200 of the present invention also includes adjustment keys 208, 210. These adjustment keys 208, 210 may serve to adjust a currently selected parameter up or down, such as in the case of setting the control temperature at which the thermostat will maintain the ambient environment. Additionally, these keys 208, 210 may scroll through the available data for a selected parameter, such as scrolling through alphanumeric data that may be selected for a given parameter. These keys 208, 210 may also function as soft keys depending on the programmatic state in which the thermostat is operating. When this functionality is provided, the function that will be instituted by selection of key 208 will be provided generally in the upper right hand corner of display 202, while the functionality that will be instituted by selection of key 210 will be displayed generally in the lower right hand corner of user display 202. In addition to the above, other user input means, such as an alphanumeric keypad, user rotatable knob, a touch screen, etc., may be utilized instead of the buttons 204–210 illustrated in the embodiment of FIG. 2.

In this embodiment, the thermostat 200 also includes operating mode visual indicators 212, 214, 216. These indicators 212–216 provide a visual indication of the current operating mode of the thermostat. In the embodiment illustrated in FIG. 2, indicator 212 will illuminate while the thermostat 200 is operating in the cooling mode. Indicator 216 will illuminate while the thermostat 200 is operating in the heating mode. Finally, indicator 214 will illuminate to indicate that the fan is operating. Depending on the particular application, this indicator 214 may illuminate whenever the fan is running, or may illuminate only when the fan is selected to run continuously.

In embodiments of the present invention that do not utilize automated switching control between the heating and cooling modes of operation, these indicators 212–216 may operate as user selectable switches to allow the consumer to select the operating mode of the thermostat 200. For example, during the summer months the consumer may select the cooling mode by depressing indicator 212. In this mode, the furnace will not be turned on even if the interior ambient temperature drops below the set point. To switch from the cooling to the heating mode of operation, the consumer, in this alternate embodiment, would need to select indicator 216 to allow the thermostat 200 to operate the furnace. Consumer selection in this embodiment of indicator 214 would operate the fan continuously, as opposed to its normal automatic operation based upon a call for cooling or heat by the thermostat 200. In a still further embodiment of the present invention, as will be discussed more fully below, the indicators 212–216 may also be utilized to provide a visual indication of system trouble or trouble with one of the appliances with which the thermostat 200 is in communication.

Having discussed the physical structure of one embodiment of an intelligent thermostat 200 constructed in accordance with the teachings of the present invention, the discussion will now focus on the operation of the system to automatically test the detectors, which forms an aspect of the present invention. Indeed, while the following discussion will utilize the structure of the thermostat 200 illustrated in FIG. 2, those skilled in the art will recognize that various other structures can be utilized without departing from the spirit and scope of the present invention. That is, regardless of the user input mechanisms utilized by the particular embodiment of the thermostat 200 of the present invention, the communications and programmatic steps provided in the following discussion may be used.

To enable the automatic, periodic detector testing provided by the present invention, the consumer accesses a detector test scheduling screen 300, such as that illustrated in FIG. 3. This detector test scheduling screen 300 will be displayed on the user interface display 202 of the thermostat 200. The scheduling parameters are listed in area 302 of screen 300, with their corresponding preset or programmed information listed in area 304. As illustrated in this exemplary screen 300, the detector test scheduling has been either pre-programmed or programmed by the consumer to occur once a month, on Wednesday, at 12:00 p.m. If this schedule does not appeal to the consumer, the consumer simply would select one of the items from listing 302 and select soft key 206 corresponding to the select function 306. The consumer would then be able to select a desired parameter for that item.

For example, assume that the consumer has selected the time item by scrolling through the list in area 302 using selection keys 208, 210, and then selecting the soft key 206 corresponding to the select function 306. The consumer would then be able to utilize the select keys 208, 210 to scroll through the available times. The timing function utilizes the thermostat's real-time clock. Once a desired time has been highlighted, the consumer would select that time to enter it into the programming of the system of the present invention. The new time would then be illustrated in area 304 of the detector test schedule screen 300. Selecting desired parameters for each of the items in area 302 would be accomplished in similar fashion. Once the consumer has selected a desired testing schedule, or is satisfied with a preprogrammed schedule, the consumer would select soft key 204 corresponding to the back function 308 to return to the thermostat's main menu.

Figure 4:
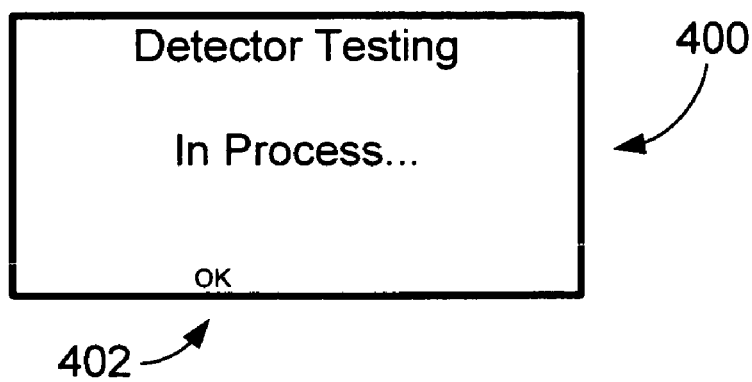

Once the detector test schedule has been programmed or accepted by the consumer, the thermostat 200 of the present invention will operate to automatically initiate a detector test at the programmed day and time. This test initiation is accomplished by the thermostat by transmitting a start test message to the detectors via the communications network. As discussed above, this communications network may be wired or wireless. Alternatively, the detector test schedule programming could be stored in the detectors. The detectors would then use this information to self-initiate the tests at the programmed times. Once the detector testing has been initiated, the thermostat will preferably display a detector testing in process screen 400 as illustrated in FIG. 4. This testing in process screen 400 will preferably remain displayed on the thermostat's user interface screen 202 until the testing is complete, or until the consumer has cleared the screen by selecting soft key 204 corresponding to the O.K. function 402.

During this period the detectors will run their self-diagnostic tests. Since such tests have been automatically initiated, the detector will preferably blink their LEDs to provide a visual indication of the in-process testing. Also in a preferred embodiment, the detectors will sound a horn pattern to provide an audible indication to the homeowner of the ongoing test. Preferably, this horn testing pattern will be short so as to not alarm the consumer or cause them to believe that an actual threat has been detected. However, such sounding of a horn pattern will allow the consumer to audibly verify that the detectors are operating properly, if the consumer is present during such automated testing.

Once the automatic system diagnostic testing is complete, the detectors will transmit appropriate diagnostic information back to the thermostat. In the case of a detector that has passed its self-diagnostic test, the diagnostic information may comprise simply a test passed message. If, however, the detector failed its self-diagnostic test, the detector would preferably transmit a test failed message to the thermostat. In a preferred embodiment, the detector sounds an audible alarm that notifies the user that the detector has failed its test. In a highly preferred embodiment, the detector will also transmit diagnostic information that will allow the consumer to determine the cause of the failure, e.g. low battery, sensor failure, etc.

Figure 5:
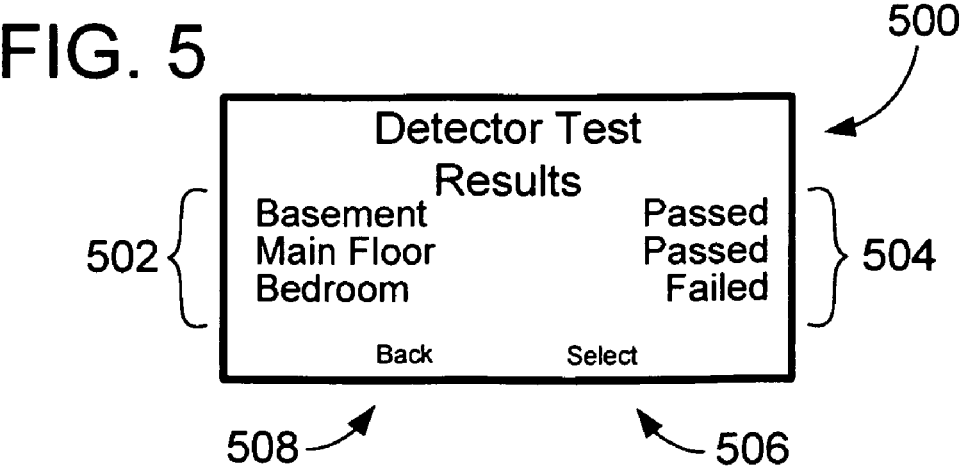

The results of these diagnostic tests will be displayed by the thermostat on its user interface display 202, for example in the form of the detector test results screen 500 illustrated in FIG. 5. This detector test results screen 500 includes a listing of each of the detectors installed in the building in area 502, along with the status of each detector's self-diagnostic test in area 504. As illustrated in this exemplary detector test results screen 500, the detector located in the basement and on the main floor have both passed their self-diagnostic tests, while the detector located in the bedroom has failed.

To determine the cause of this failure, the user may scroll through the listing of detectors in area 502 utilizing the selector keys 208, 210 to highlight the bedroom detector. The consumer would then simply select soft key 206 corresponding to the select function 500 to pull up a screen listing the information relayed from the detector as to why it has failed its self-diagnostic test.

Figure 6:
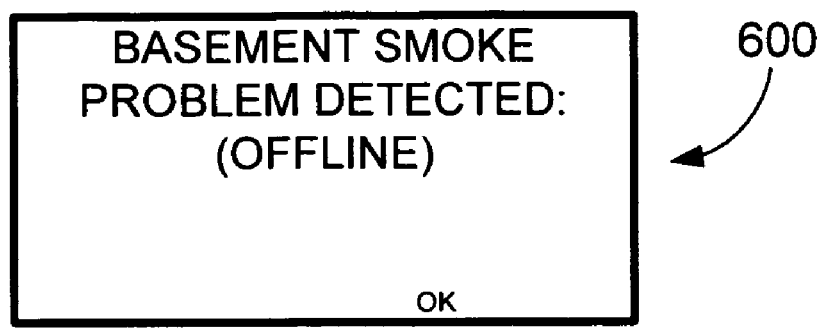

If no information regarding the pass or failure of the self-diagnostic test is received from a detector, the detector test results screen 500 will indicate that that detector has failed its self-diagnostic test, and will indicate upon consumer query that the failure is a result of a lack of communication with that detector. Indeed, at any time that the detector fails to communicate when it should, a warning message indicating that the detector is offline, e.g. the warning screen 600 of FIG. 6, will be displayed to the user. As this condition may occur at any time, especially in embodiments of the present invention that utilize heartbeat signals with the connected devices to ensure their continued operational status on the network, display of screen 600 may also include turning on of the display backlight, flashing of the backlight or LEDs, etc.

The consumer may then use the information displayed on these screens to determine why the detector is not communicating with the thermostat 200. Lack of communication may be a result of a loss of its power source, e.g. dead battery, or because the installed detector does not have communications capability or has a failed communications circuit. The consumer may then decide to correct the problem, e.g. replace the dead battery, or if it is a communications problem, simply perform a manual self-test on the detector to manually determine its operability. The detector test results screen will be displayed on the user interface display 202 of thermostat 200 until the consumer acknowledges the screen by selecting soft key 204 corresponding to the back function 508.

In addition to the automatic, periodic testing of the threat detectors located in a dwelling enabled by the intelligent thermostat 200 of the present invention, a manually initiated test may also be provided. That is, because the thermostat may communicate control and diagnostic signals with the detectors, this thermostat 200 provides a convenient, centrally located, easily accessible location from which a consumer may manually initiate a detector self-test. This dispenses with the requirement that the consumer get a step ladder to enable the consumer to reach the detector test button to manually initiate the system diagnostic test. Such manually initiated testing may allow testing of all detectors at once, or only select detectors on which the consumer wishes to run a test. Once the consumer has manually initiated the detector self-diagnostic tests, the thermostat will operate as discussed above for the automatic testing, including display of the testing in process screen 400 and the detector test results screen 500 at the completion of the self-diagnostic tests.

With the communication capability of the system of the present invention and the knowledge of the location of each of the detectors, the user interface screen can also be used to display information identifying which detector has first detected a threat. This is particularly useful in networked detector systems where all detectors are sounded when any one detector detects a hazardous condition. In such systems, occasionally detectors in a building may false alert, or react to non-threat level of smoke from a know source such as a kitchen or fireplace. However, in a building with networked detectors that all react to the detected condition, it is difficult to determine the offending detector. While some detectors include a temporary alarm locate (TAL) which will silence all but the offending detector, it is difficult to reach the button.

Figure 7:
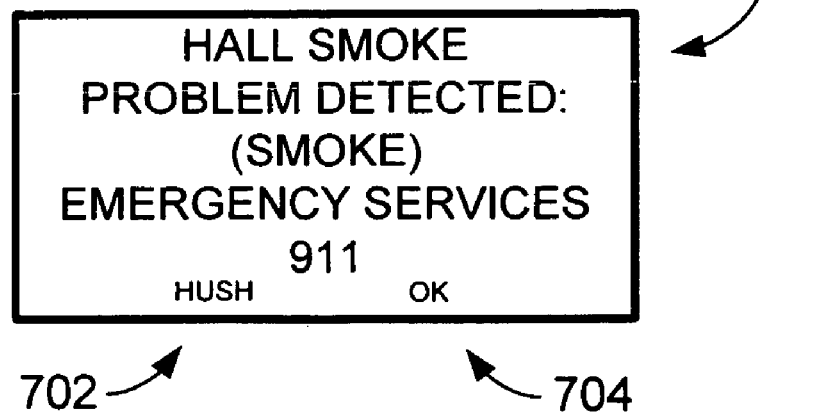

Recognizing this, the system of the present invention will identify to the user, e.g. via screen 700 illustrated in FIG. 7, the offending detector or the first to identify the threat, and what the detected threat is. With this information, the user may more easily determine if the threat is real. To draw attention to this message, the system may also turn on the display backlight, may flash the backlight, LEDs, etc. Additionally, the user may initiate the temporary alarm locate (TAL) function by selecting the hush function 702 via soft key 204. This would silence all but the initial detector to detect the hazardous condition for a brief period. Once the message has been read, the user can clear the display by selecting the ok function 704 via soft key 206.

While a preferred embodiment of the present invention utilizes the intelligent thermostat 200 to coordinate the system operation discussed above, the system of the present invention also contemplates the use of a central control point to coordinate operation of the system. This central control point need not be a thermostat. That is, the central control point could be a separate controller having a user interface whose functionality is limited to coordination of and communication with the components in the system. This separate controller may be a stand alone controller, may be a PC application, etc. Additionally, in embodiments of the present invention in which an intelligent thermostat provides this central control point, the user interface and the control portions of such a thermostat need not be integrated into a single housing. That is, the user interface may be mounted in a commonly user accessed area for convenience, while the control electronics could be located remotely from the user interface.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A hazardous condition detection system, comprising:
   at least one hazardous condition detector;
   a thermostat having a user interface display, the thermostat being operably coupled to the at least one hazardous condition detector for communications therewith;
   wherein the at least one hazardous condition detector transmits information to the thermostat upon detection of a hazardous condition, and wherein the thermostat displays the information on the user interface display; and
   wherein the information comprises location information.

2. The system of claim 1, wherein the information comprises hazard type information.

3. A hazardous condition detection system, comprising:
   at least one hazardous condition detector;
   a thermostat having a user interface display, the thermostat being operably coupled to the at least one hazardous condition detector for communications therewith; and
   a plurality of hazardous condition detectors in communications with the thermostat, and wherein the thermostat transmits a temporary alarm locate (TAL) signal to the plurality of hazardous condition detectors to initiate the TAL function within the plurality of hazardous condition detectors.

4. The system of claim 1, wherein the thermostat displays an indication that one of the at least one hazardous condition detectors is not communicating with the thermostat on the user interface display when the thermostat determines that one of the at least one hazardous condition detectors is no longer communicating.

5. A hazardous condition detection system, comprising:
   at least one hazardous condition detector;
   a thermostat having a user interface display, the thermostat being operably coupled to the at least one hazardous condition detector for communications therewith; and
   wherein the thermostat includes a user programmable hazardous condition detector test schedule function, and wherein the thermostat transmits a detector self test initiate signal to the at least one hazardous condition detector at a programmed time.

6. The system of claim 5, wherein the at least one hazardous condition detector transmits self test results information to the thermostat, and wherein the thermostat displays the self test results information on the user interface display.

7. A thermostat for controlling a dwelling's heating, ventilating and air conditioning (HVAC) system, the dwelling having installed therein at least one hazardous condition detector, comprising:
   a user interface display;
   means for communicating with the at least one hazardous condition detector;
   wherein the thermostat displays information regarding the at least one hazardous condition detector on the user interface display; and
   wherein the information comprises information identifying a location of a hazardous condition detected by the at least one of the hazardous condition detectors.

8. The thermostat of claim 7, wherein the information comprises information identifying a type of a hazardous condition detected by the at least one of the hazardous condition detectors.

9. The thermostat of claim 7, wherein the dwelling has installed therein a plurality of hazardous condition detectors, wherein the thermostat transmits a temporary alarm locate (TAL) signal to the plurality of hazardous condition detectors to initiate the TAL function within the plurality of hazardous condition detectors.

10. The thermostat of claim 7, wherein the thermostat displays a warning on the user interface display that the thermostat is no longer communicating with the at least one hazardous condition detector.

11. The thermostat of claim 7, further comprising a user programmable hazardous condition detector test schedule function, and wherein the thermostat transmits a detector self test initiate signal to the at least one hazardous condition detector at a programmed time.

12. The thermostat of claim 11, wherein the thermostat displays self test results information on the user interface display received from the at least one hazardous condition detector upon completion of the hazardous condition detector self test.

13. A method of testing at least one hazardous condition detector, comprising the steps of:
  transmitting by an intelligent thermostat a detector control signal to the at least one hazardous condition detector; and
  displaying information relating to the at least one hazardous condition detector on a user interface display of the intelligent thermostat.

14. A method of testing at least one hazardous condition detector, comprising the steps of:
  transmitting by an intelligent thermostat a detector control signal; and
  displaying information relating to the at least one hazardous condition detector on a user interface display of the intelligent thermostat; and
  wherein the step of transmitting by an intelligent thermostat a detector control signal comprises the step of transmitting by an intelligent thermostat a detector self test signal to the at least one hazardous condition detector; and
  wherein the step of displaying information relating to the at least one hazardous condition detector comprises the step of displaying a test in progress message on a user interface display of the intelligent thermostat, the method further comprising the steps of:
  receiving diagnostic information from the at least one hazardous condition detector; and
  displaying the diagnostic information on the user interface display.

15. The method of claim 14, further comprising the step of receiving user input to set an automatic testing schedule for the at least one hazardous condition detector within the intelligent thermostat prior to performing the steps of transmitting the detector self test signal, displaying the test in progress message, receiving diagnostic information, and displaying the diagnostic information.

16. The method of claim 14, further comprising the step of receiving a user input to initiate a manual hazardous condition detector test, and thereafter performing the steps of transmitting the detector self test signal, displaying the test in progress message, receiving diagnostic information, and displaying the diagnostic information.

17. A method of testing at least one hazardous condition detector, comprising the steps of:
  transmitting by an intelligent thermostat a detector control signal; and
  displaying information relating to the at least one hazardous condition detector on a user interface display of the intelligent thermostat;
  receiving no communications from the at least one hazardous condition detector; and
  wherein the step of displaying information relating to the at least one hazardous condition detector comprises the step of displaying a warning on the user interface display that the at least one hazardous condition detector is no longer communicating with the thermostat.

18. A method of alerting a user to a hazardous condition, comprising the steps of:
  receiving by a thermostat information from at least one hazardous condition detector that has detected a hazardous condition;
  displaying information on a user interface display of the thermostat alerting the user to the hazardous condition;
  receiving at the thermostat user input to initiate a temporary alarm locate (TAL) function; and
  broadcasting by the thermostat a TAL control signal to the at least one hazardous condition detector.

19. The method of claim 18, wherein the step of displaying comprises the step of displaying location information on a user interface display of the thermostat alerting the user to the location of the hazardous condition.

20. The method of claim 18, wherein the step of displaying comprises the step of displaying hazard type information on a user interface display of the thermostat alerting the user to the type of the hazardous condition.

* * * * *